United States Patent [19]

Tutiyasu

[11] Patent Number: 5,153,604
[45] Date of Patent: Oct. 6, 1992

[54] LASER BEAM PRINTER WITH FIXED START OF SCANNING AND METHOD OF OPERATION OF THE PRINTER

[75] Inventor: Kouitirou Tutiyasu, Toyokawa, Japan

[73] Assignee: Minolta Camera Kabushiki Kaisha, Osaka, Japan

[21] Appl. No.: 589,529

[22] Filed: Sep. 28, 1990

[30] Foreign Application Priority Data

Oct. 2, 1989 [JP] Japan ................................. 1-257373

[51] Int. Cl.⁵ .......................... G01D 9/40; G01D 9/42; G01D 15/14
[52] U.S. Cl. ..................................... 346/1.1; 346/108; 346/160
[58] Field of Search ................ 346/108, 107 R, 107 A, 346/1.1, 160; 358/199, 208, 214, 480, 481, 413

[56] References Cited

U.S. PATENT DOCUMENTS

| | | | |
|---|---|---|---|
| 4,212,018 | 7/1980 | Ohnishi et al. | 346/108 X |
| 4,264,120 | 4/1981 | Uchiyama et al. | 358/199 X |
| 4,350,988 | 9/1982 | Masegi | 346/108 |
| 4,978,849 | 12/1990 | Goddard et al. | 346/108 X |

FOREIGN PATENT DOCUMENTS

0285097 10/1988 European Pat. Off. ............ 346/160
58-127108 7/1983 Japan .

Primary Examiner—Benjamin R. Fuller
Assistant Examiner—David Yockey
Attorney, Agent, or Firm—Burns, Doane, Swecker & Mathis

[57] ABSTRACT

A laser beam printer is provided with a sensor for controlling the timing of inscribing image data on a photosensitive member by means of a laser beam scanning the surface of the photosensitive member. The output signal of this sensor rises when the laser beam reaches a prescribed position and falls when the laser beam passes the prescribed position. The time between the rising time and the falling time is used as the standard. Inscription of image data in each scanning line is started after elapse of a prescribed time following the standard time. The standard time remains unchanged in spite of a possible change in the sensor output. On the photosensitive member, the position for starting inscription of each scanning line can be set at the fixed position with high accuracy.

12 Claims, 4 Drawing Sheets

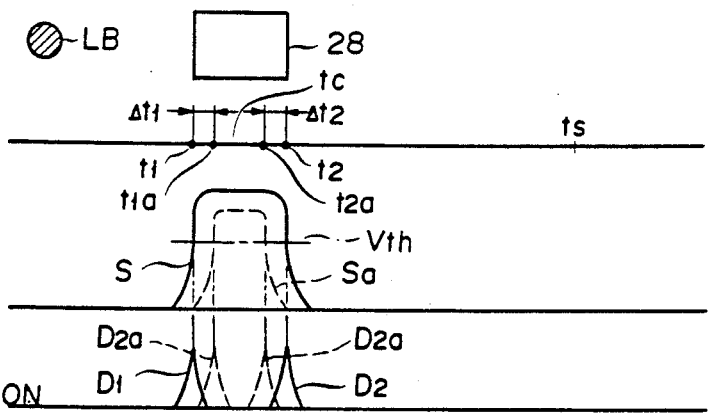
FIG. 5
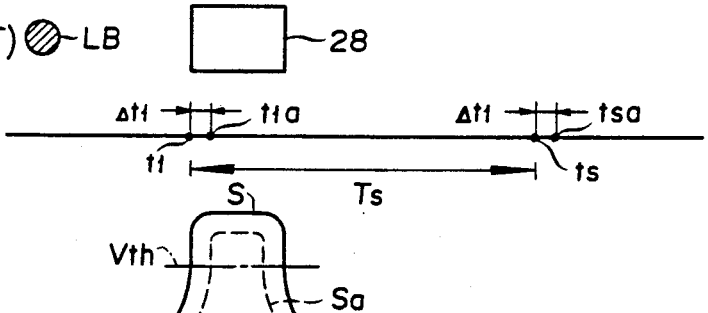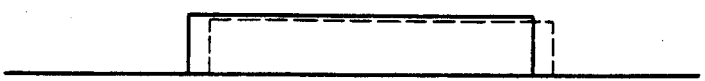
FIG. 6 (RELATED ART)

LASER BEAM PRINTER WITH FIXED START OF SCANNING AND METHOD OF OPERATION OF THE PRINTER

BACKGROUND OF THE INVENTION

1. Field of the Invention

This invention relates to a laser beam printer for reproducing image data on a recording paper by projecting on a photosensitive member a laser beam modulated in accordance with the image data and more particularly to a laser beam printer provided with a controlling device for controlling the timing of emission of the image data.

2. Description of Related Art

A laser beam printer reproduces on a recording paper an image conforming to given image data by projecting in a scanning pattern a laser beam modulated in accordance with the image data on the periphery of a photosensitive drum in which is rotating in the direction along the axis of rotation of the photosensitive drum thereby forming a corresponding latent image on the periphery of the photosensitive drum and subsequently transferring the latent image in the form of a sensible image to the recording paper.

In order that the leading data of the successive scanning lines impinging on the photosensitive drum may be aligned at a fixed position in the circumferential direction of the photosensitive drum and, consequently, the position for inscription of a latent image on the photosensitive drum may be fixed, the emission of given image data in each of the scanning lines is started after the elapse of a prescribed time following the detection of a laser beam at a point preceeding the position for starting the inscription. This detection of the laser beam is accomplished by a SOS (start of scanning) sensor formed of a photodiode, for example, which is disposed at a location preceding the aforementioned position for starting the inscription. U.S. Pat. No. 4,264,120 discloses detection unit which is provided with a photoelectric conversion element for controlling the timing of starting the emission of light data onto the photosensitive drum. This detection unit issues a start signal after the elapse of a prescribed time following the detection of the laser beam.

The SOS sensor issues an output signal on being traversed by the laser beam and, with the elapse of a prescribed time after the output signal surpasses a prescribed threshold, sends forth the leading data of a successive scanning line. The output level of this sensor, however, is susceptibile of variation with numerous environmental conditions. A laser diode which generates a laser beam modulated in accordance with given image data, for example, undergo variation in the amount of generated light with a change in temperature. The output level of the sensor, therefore fluctuates proportionately to this variation. Further, there is a circuit element which monitors the amount of light generated by the aforementioned laser diode and stabilizes the amount of light. The operation of this circuit element may also vary with temperature. Moreover, the aforementioned sensor has the sensitivity thereof affected by a change in temperature and, consequently, the output thereof fluctuates proportionately.

Such a change in the output level of the aforementioned sensor entails the disadvantage that this change reflects itself in the time of detection serving as the standard for the timing of inscription of the leading data of each scanning line and, as a result, induces the phenomonon of jitter, i.e. a deviation of the position for starting inscription of each of the scanning lines projected on the photosensitive drum.

To preclude the occurrence of any undesirable phenomenon of this sort, it has been proposed, as disclosed in Japanese Patent Application Laid-Open 58-127,108, to have two SOS sensors disposed as arranged in the direction of scanning route at the points preceding the position for starting inscription of the leading data and enable the timing of inscription to be controlled on the basis of the time at which the trailing edge of the output of one of the sensors and the trailing edge of the output of the other sensor overlap. In this case, the time of this overlapping is substantially fixed even when the output levels of the two sensors vary. The use of two such sensors not only adds to complication of the control circuit but also requires an adjustment an, not necessarily easy in setting the mutual positions of the two sensors with high accuracy.

When a special sensor having these two sensors integrally incorporated therein is used, the cost of sensor is high.

An object of this invention is to provide a laser beam printer which, by the use of one sensor, enables the position for starting inscription of each of scanning lines to be fixed in spite of a possible fluctuation of the output level of the sensor.

Another object of this invention is to provide a laser beam printer which, by the use of a sensor disposed at a point preceding the position for starting inscription, enables the timing of starting the inscription to be set on the basis of the intermediate time between the rising time and the falling time of an output signal generated by the sensor on detecting the laser beam.

In accordance with the present invention there is provided a laser beam printer capable of modulating a laser beam scanning the surface of a photosensitive member with image data, comprising detection means for detecting the scanning laser beam at a prescribed position and issuing a detection signal which rises when said laser beam reaches said prescribed position and falls when said laser beam passes said prescribed position, first pulse train generating means for generating a first pulse train in response to said rise of said detection signal, second pulse train generating means for generating a second pulse train in response to said fall of said detection signal, counting means for counting the total number of pulses of said first pulse train and said second pulse train, and permit signal output means for issuing a permit signal indicating the timing of supplying said image data when the total number of pulses counted by said counting means reaches a prescribed value.

BRIEF DESCRIPTION OF THE DRAWINGS

FIG. 5 is a time chart for illustrating the operation of the signal processing circuit shown in FIG. 2;

FIG. 6 is a time chart for illustrating the operation of the conventional signal processing circuit.

DESCRIPTION OF THE PREFERRED EMBODIMENTS

Figure 1:
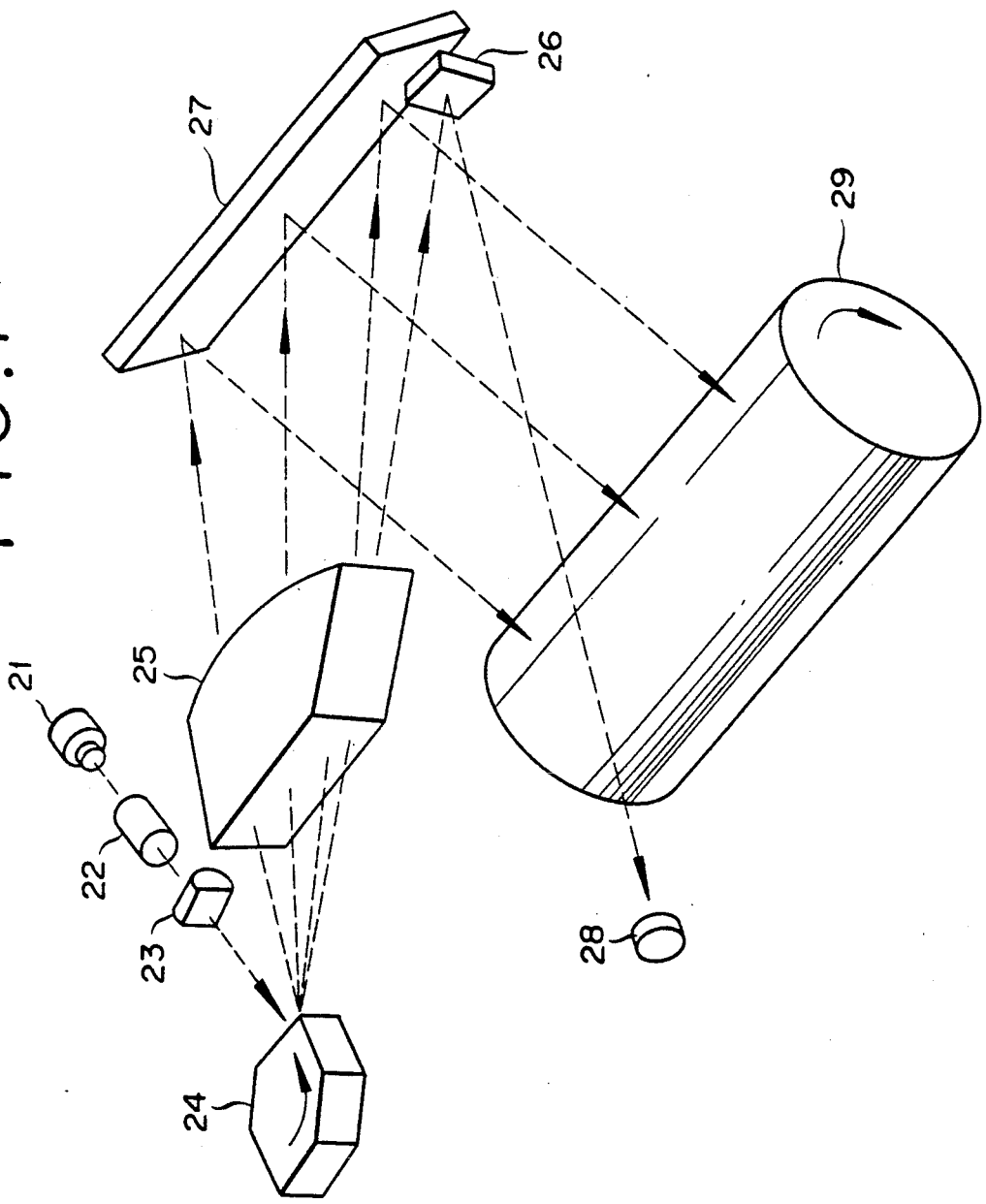
FIG. 1 is a schematic perspective view illustrating an optical system for a laser beam printer.

As illustrated in FIG. 1, the laser beam from a laser diode 21 is shaped by a collimator 22 and a cylindrical lens 23 and then caused to impinge on the scanning surfaces of a rotary polygonal mirror 24 as a laser beam deflector. This polygonal mirror 24 has a regular polygonal cross section and is rotated at a high fixed speed. The beam reflected by this polygonal mirror 24 is moved in the main scanning direction and, with the speed of this motion in the main scanning direction uniformized by a f$\theta$ lens 25, brought to a first mirror 27, reflected on this mirror, and projected on the surface of a photosensitive drum 29. Owing to the main scanning motion imparted by the polygonal mirror 24 and the sub-scanning motion imparted by the rotation of the aforementioned photosensitive drum 29, an electrostatic latent image conforming to image data supplied to the laser diode 21 is inscribed on the surface of the photosensitive drum 29. This electrostatic latent image is reproduced as a sensible image on a recording paper by a known image forming device (not shown).

A second mirror 26 is disposed, as juxtaposed to the first mirror 27, at a position on the forward side of the scanning route, namely the position the laser beam assumes before it sweeps the first mirror 27 in the main scanning direction. This second mirror 26, for the purpose of timing the inscription of the leading data of each scanning line, reflects the laser beam to a photodiode or a SOS sensor 28. This sensor 28 is used for detecting the reflected light from the second mirror 26 and deciding the timing of supplying, the image data to the laser diode 21.

FIG. 6, for aiding in the comprehension of the present invention, illustrates an operation produced in the conventional control circuit for enabling the sensor 28 to detect the laser beam and issuing an inscription permit signal PS to the laser diode 21. As illustrated in FIG. 6 (A), when the laser beam LB traverses the sensor 28, the sensor 28 generates a sensor output S having a width shown in FIG. 6 (B) while it is receiving the beam LB. This output S is converted into a rectangular wave by the processing for binary notation based on the threshold value of Vth and injected into a differentiation circuit. FIG. 6 (C) illustrates the differential output D. It has been conventional to start a timer as shown in FIG. 6 (D) based on the time t1 of the detection of the rising edge of the output of the sensor 28 and, after this timer has counted up a set time ts generate an inscription permit signal PS as shown in FIG. 6 (E). Thus, the laser diode 21 has been conventionally controlled on the basis of the time of the rising edge or falling edge of the sensor output as described above. The term "edge" as used herein is defined as the state in which the status of a given signal is changed from ON to OFF or from OFF to ON.

In this case, when the output level of the sensor 28 is lowered as indicated by a broken line Sa in FIG. 6 (B). the differential output is delayed by a time $\Delta t1$ as shown in FIG. 6 (A). The detection time t1 destined to serve as the standard for the time ts for starting inscription of the leading data of each scanning line, consequently, is delayed to t1$a$ by the time $\Delta t1$ and, as a result, the time ts for initiating inscription is delayed to tsa by the time $\Delta t1$, opening up the possibility of inducing the occurrence of the aforementioned jitter.

The present invention contemplates causing the permit signal to be issued on the basis of the time intermediate between the time of the rising edge and the time of the falling edge of the output signal of the sensor 28 as shown in FIG. 5.

Figure 2:
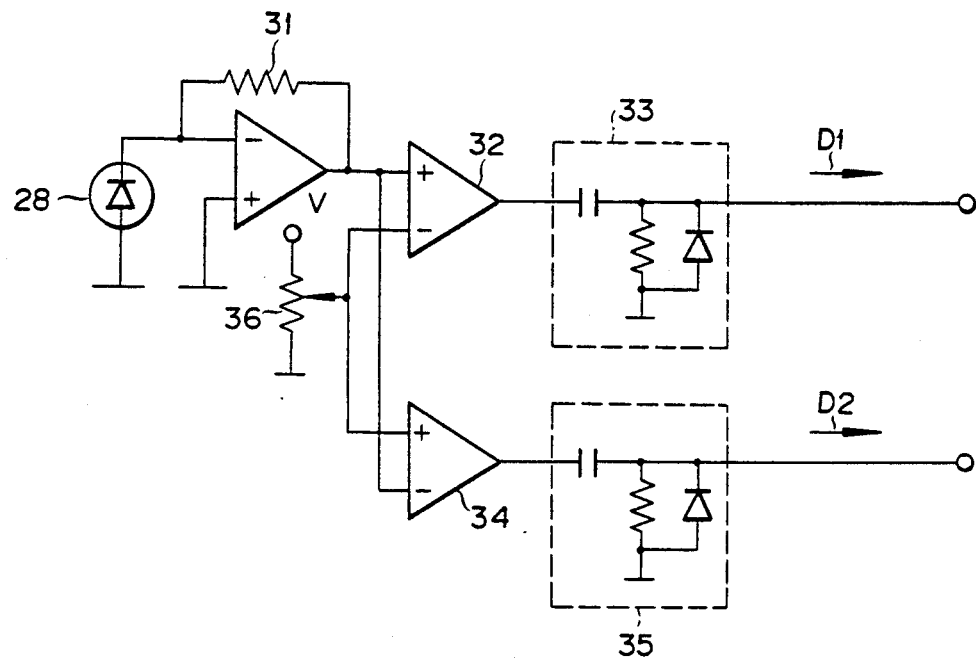
FIG. 2 is a signal processing circuit for detecting the initiating edge and the trailing edge of an output signal issued from a SOS sensor.

The sensor 28 detects a laser beam spot LB at the position preceding the position for starting the scanning in each line and generates a current output S proportionate to the amount of light received as shown in FIG. 5 (B). This output is converted to an equivalent voltage output by an operational amplifier 31 shown in FIG. 2 and is then injected into a non-inverting input terminal of a comparator 32 and an inverting input terminal of a comparator 34. To the inverting input terminal of the comparator 32 and the non-inverting input terminal of the comparator 34, a threshold voltage Vth for giving the threshold for comparison is injected. This voltage Vth is set at a desired value by a variable resistor 36. As a result of the comparison with the threshold Vth, the comparator 32 issues a positive rectangular wave proportionate to the output of the sensor 28 and the comparator 34 issues a negative rectangular wave. The positive rectangular wave issued from the comparator 32 is injected into a differentiation circuit 33 and converted into a differential output D1 proportionate to the initiating edge of the output of the sensor 28 as shown in FIG. 5 (C). The negative rectangular wave issued from the comparator 34 is injected into a differentiation circuit 35 and converted into a differential output D2 proportionate to the trailing edge of the output of the sensor 28.

Figure 3:
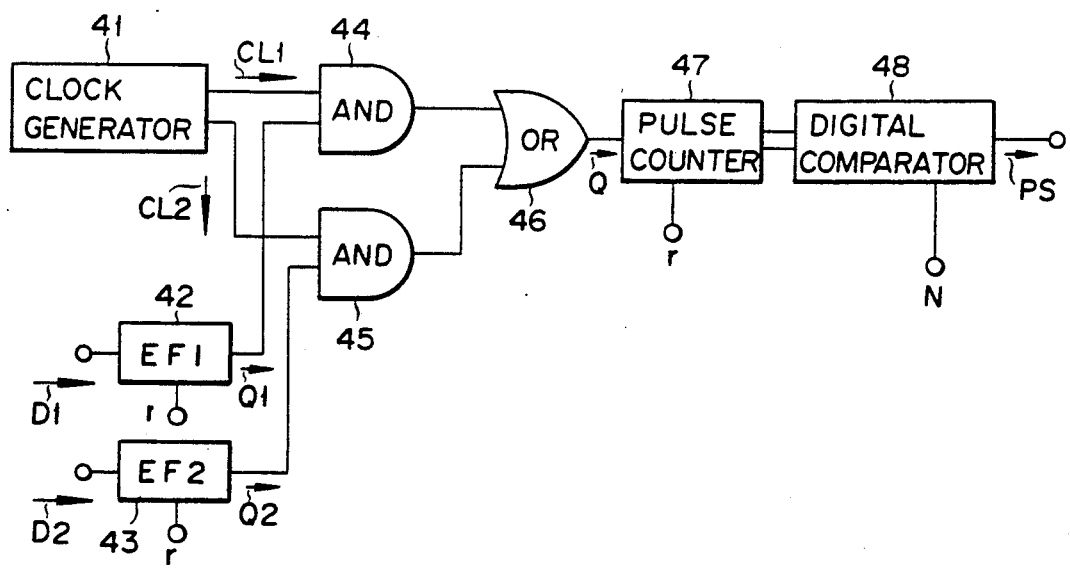
FIG. 3 is an inscription permit signal generating circuit for calculating a standard time in response to the output signal from the signal processing circuit and issuing a command indicating the timing of emitting image data.

The differential output D1 is injected into a flipflop 42 for effecting edge trigger of the permit signal generating circuit shown in FIG. 3. From this flipflop 42, an output Q1 shown in FIG. 4 (C) is injected into an AND gate 44. Similarly, the differential output D2 is injected into a flipflop 43 for edge trigger. From this flipflop 43, and output Q2 shown in FIG. 4 (F) is injected into an AND gate 45.

Figure 4:
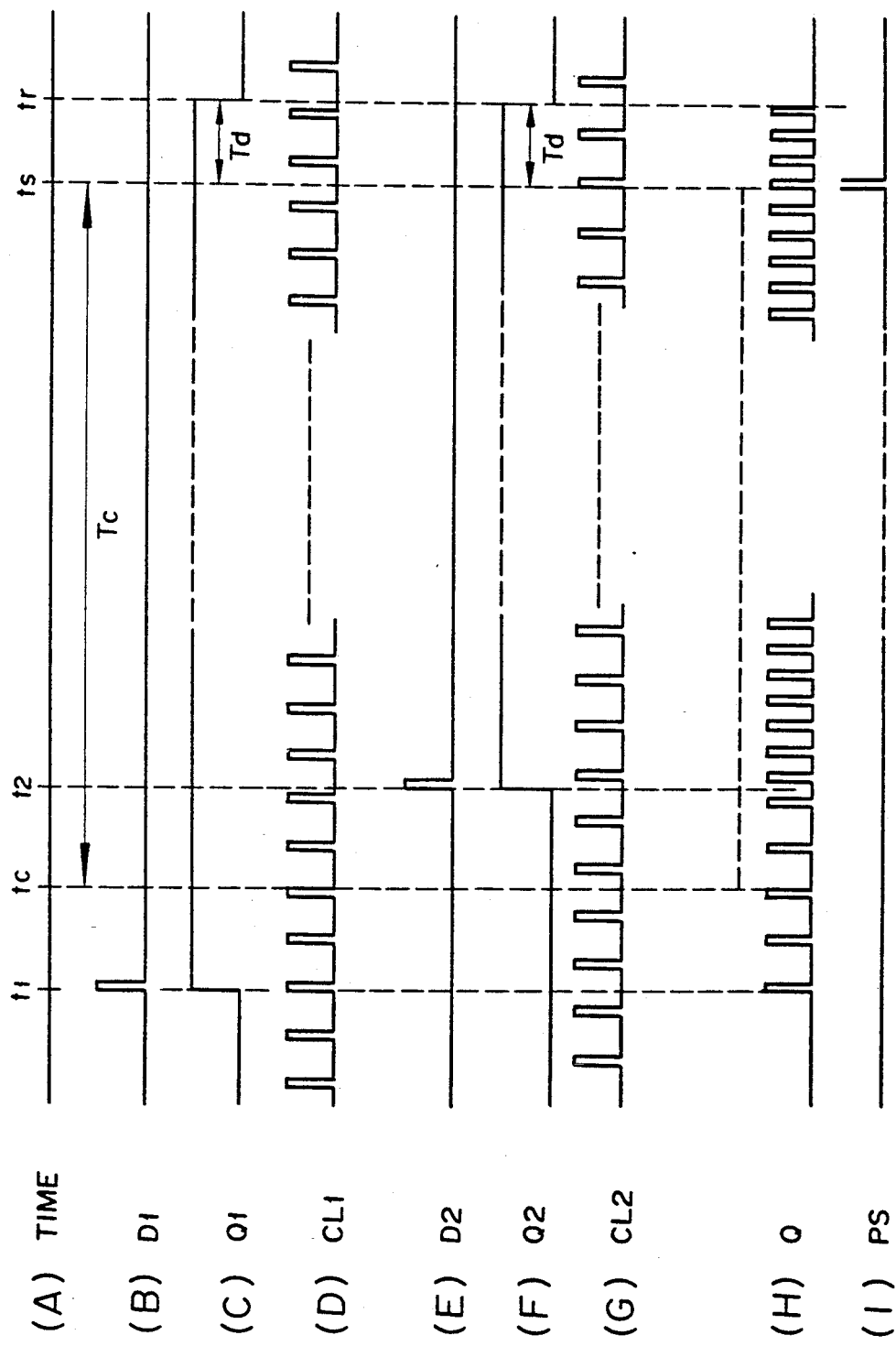
FIG. 4 is a time chart for illustrating the operation of the permit signal generating circuit shown in FIG. 3.

To the AND gate 44, a clock pulse train CL1 shown in FIG. 4 (D) issued from a clock generator 41 is injected. Similarly, to the AND gate 45, a clock pulse train CL2 shown in FIG. 4 (G) and issued from the clock generator 41 is injected. These clock pulse trains CL1, CL2 have an identical cycle and are deviated in phase from each other. Owing to this arrangement, the clock pulse CL1 is issued after the time t1 from the AND gate 44 and the clock pulse CL2 after the time t2 from the AND gate 45.

The outputs from the two AND gates 44, 45 are injected into an OR gate 46. The OR gate 46, therefore, generates the clock pulse train CL1 between the times t1 and t2 and the total pulse of the clock pulse trains CL1 and CL2 between the times t2 and tr as shown in FIG. 4 (H).

The output Q from the OR gate 46 is injected into a pulse counter 47, wherein the number of pulses of the output Q is counted. The pulse counter 47 delivers the resultant count to a digital comparator 48. This digital comparator 48 has a prescribed value N set in advance therein and is adapted to issue a signal PS for permitting inscription of the leading data of a line when the input value from the pulse counter 47 reaches the prescribed value N, so as to start the inscription of the data of the line. With the elapse of a prescribed time Td thereafter, a reset signal is emitted at the time tr and transmitted to the two flipflops 42, 43 and to the pulse counter 47. Consequently, the two flipflops and the pulse counter are put to the state awaiting the arrival of a sensor output for the next line.

The prescribed value N mentioned above is two times the quotient of the time Tc from the aforementioned standard time tc to the time ts for generation of the permit signal divided by the cycle of the clock pulse CL1 or CL2. In this arrangement, the inscription permit signal PS from the digital comparator 48 is generated at the time ts which terminates the prescribed time Tc following the standard time tc intermediate between the time t1 and the time t2. This prescribed time Tc equals the quotient of the distance between the position at which the sensor 28 detects the laser beam LB in the ideal state and the target position for starting inscription of data divided by the linear speed of the scanning line in the main scanning direction.

When the output level of the sensor 28 is lowered as indicated by a broken line Sa shown in FIG. 5, a differential output D1a corresponding to the initiating edge of the sensor output Sa is generated at the time t1a delayed by the time Δt1 from the time t1 and a differential time D2a corresponding to the trailing edge is generated at the time t2a advanced by the time Δt2 from the time t2. Since the output waveform of the sensor 28 is substantially symmetrical and, therefore, Δt1 is approximated equal Δt2, the intermediate time between the time t1a and the time t2a therefore approximates very closely the aforementioned standard and ideal time Tc. The time at which the start of inscription of the leading data of each scanning line is permitted is very close to the aforementimed time ts. As a result, the position for starting inscription of the leading data of each scanning line is controlled to a substantially fixed position in the main scanning direction of the photosensitive drum 29 in spite of a possible fluctuation of the output level of the sensor 28 so long as the inscription start permit signal PS is generated when the total number of pulses from the OR gate 46 reaches the prescribed value N.

In the illustrated embodiment, the first pulse train generated in response to the rising signal of the sensor 28 and the second pulse train generated in response to the falling singal are counted by the common pulse counter 47 and the permit signal is generated when the resultant count reaches the prescribed value N. Optionally, two separate counters may be used one for counting the first pulse train CL1 and the other for counting the second pulse train CL2 and the permit signal PS may be issued when the total of the resultant counts reaches the prescribed value N.

What is claimed is:

1. A laser beam printer using image data to modulate a laser beam scanning a surface of a photosensitive member, comprising:
   detection means for detecting the scanning laser beam at a prescribed position and issuing a detection signal which rises when said laser beam reaches said prescribed position and falls when said laser beam passes said prescribed position;
   first pulse train generating means for generating a first pulse train in response to said rise of said detection signal;
   second pulse train generating means for generating a second pulse train in response to said fall of said detection signal;
   counting means for counting a total number of pulses of said first pulse train and said second pulse train; and
   permit signal output means for issuing a permit signal indicating timing for supplying said image data when the total number of pulses counted by said counting means reaches a prescribed value.

2. A laser beam printer according to claim 1, wherein said prescribed value is determined on a basis of a time period measured from a rising time and a falling time of said detection signal and an ideal time for emission of said image data when said laser beam is producing an ideal scanning motion.

3. A laser beam printer using image data to modulate a laser beam scanning a surface of a photosensitive member, comprising:
   detection means for detecting said scanning laser beam at a prescribed position and emitting a detection signal which rises when said laser beam reaches said prescribed position and falls when said laser beam passes said prescribed position;
   first signal generating means for generating a first signal in response to the rise of said detection signal;
   second signal generating means for generating a second signal in response to the fall of said detection signal;
   first pulse train generating means for generating a first pulse train in response to said first signal;
   second pulse train generating means for generating a second pulse train in response to said second signal;
   counting means for counting a total number of pulses of said first pulse train and said second pulse train; and
   permit signal output means for issuing a permit signal indicating timing for supplying said image data when the the total number of pulses counted by said counting means reaches a prescribed value.

4. A laser beam printer according to claim 3, wherein said prescribed value is determined on a basis of a time period measured from a rising time and a falling time of said detection signal and an ideal time for emission of said image data when said laser beam is producing an ideal scanning motion.

5. A laser beam printer using image data to modulate a laser beam scanning a surface of a photosensitive member, comprising:
   detection means for detecting said scanning laser beam at a prescribed position and issuing a detection signal which rises when said laser beam reaches said prescribed position and falls when said laser beam passes said prescribed position;
   first signal generating means for generating a first signal in response to the rise of said detecting signal;
   second signal generating means for generating a second signal in response to the fall of said detection signal;
   pulse generating means for generating a first pulse train signal and a second pulse train signal;
   first gate means, responsive to said first signal generating means and said pulse generating means, for generating a first gate pulse output signal having a frequency the same as said first pulse train signal in response to the generation of said first signal;
   second gate means, responsive to said second signal generating means and said pulse generating means, for generating a second gate pulse output signal having a frequency the same as said second pulse train signal in response to the generation of said second signal;

counting means for counting a total number of pulses of said first gate pulse output signal issued from said first gate means and of said second gate pulse output signal issued from said second gate means; and permit signal output means for issuing a permit signal indicating timing for supplying said image data when the total number of pulses counted by said counting means reaches a prescribed value.

6. A laser beam printer according to claim 5, wherein said prescribed value is determined on a basis of a time period measured from a rising time and a falling time of said detection signal and an ideal time for emission of said image data when said laser beam is producing an ideal scanning motion.

7. A laser beam printer using image data to modulate a laser beam scanning the surface of a photosensitive member, comprising:

a detection element disposed at a prescribed position and for detecting the scanning laser beam;

detection signal output means for generating a first signal when said laser beam reaches said detecting element and a second signal when said laser beam passes said detection element; and permit signal output means for deciding timing for issuing said image data on the basis of said first signal and said second signal.

8. A laser beam printer according to claim 7, wherein said permit signal output means issues a permit signal after elapse of a prescribed time following a time interval between generation of said first signal and said second signal.

9. A method for operation of a laser beam printer using image data to modulate a laser beam scanning a surface of a photosensitive member, said method comprising the steps of:

detecting a scanning laser beam at a prescribed position and issuing a detection signal, said detection signal rising when said laser beam reaches said prescribed position and falling when said laser beam passes said prescribed position;

generating a first signal in response to the rising of said detection signal;

generating a second signal in response to the falling of said detection signal;

generating a first pulse train in response to said first signal;

generating a second pulse train in response to said second signal;

counting a total number of pulses of said first pulse train and said second pulse train; and issuing a permit signal for determining a timing for supplying said image data when the total number of pulses reaches a prescribed value.

10. A method according to claim 9, wherein said prescribed value is determined on a basis of a time period measured from a rising time and a falling time of said detection signal and an ideal time for supplying said image data when said laser beam is producing an ideal scanning motion.

11. A method for operation of a laser beam printer using image data to modulate a laser beam scanning a surface of a photosensitive member, said method comprising the steps of:

detecting the scanning laser beam at a prescribed position and issuing a detection signal, said detection signal rising when said laser beam reaches said prescribed position and falling when said laser beam passes said prescribed position;

generating a first pulse train in response to the rising of said detection signal;

generating a second pulse train in response to the falling of said detection signal;

counting a total number of pulses of said first pulse train and said second pulse train; and a permit signal for determining a timing for supplying said image data when the total number of pulses reaches a prescribed value.

12. A method according to claim 11, wherein said prescribed value is determined on a basis of a time period measured from a rising time and a falling time of said detection signal and an ideal time for supplying said image data.

* * * * *